United States Patent
Trybula

(10) Patent No.: US 11,187,308 B2
(45) Date of Patent: Nov. 30, 2021

(54) ACTUATOR

(71) Applicant: HS Wroclaw Sp. z o. o., Wroclaw (PL)

(72) Inventor: Daniel Trybula, Spytkowice (PL)

(73) Assignee: HS WROCLAW SP. Z O. O., Wroclaw (PL)

( * ) Notice: Subject to any disclaimer, the term of this patent is extended or adjusted under 35 U.S.C. 154(b) by 120 days.

(21) Appl. No.: 16/453,406

(22) Filed: Jun. 26, 2019

(65) Prior Publication Data
US 2019/0316660 A1  Oct. 17, 2019

Related U.S. Application Data

(62) Division of application No. 14/946,161, filed on Nov. 19, 2015, now Pat. No. 10,378,624.

(30) Foreign Application Priority Data

Nov. 21, 2014  (EP) ..................... 14461591

(51) Int. Cl.
*F16H 25/20* (2006.01)
*F16H 25/22* (2006.01)
(Continued)

(52) U.S. Cl.
CPC ......... *F16H 25/2214* (2013.01); *B64C 13/32* (2013.01); *F16C 29/068* (2013.01);
(Continued)

(58) Field of Classification Search
CPC .... F16H 25/186; F16H 25/20; F16H 25/2247; F16H 25/12
(Continued)

(56) References Cited

U.S. PATENT DOCUMENTS 2,246,733 A   6/1941  Keifer
2,883,183 A * 4/1959  Finsterwalder ............ B60J 1/14
                                              49/26
(Continued)

FOREIGN PATENT DOCUMENTS

AU   4597179 A   10/1979
DE    304771 C    6/1919
(Continued)

OTHER PUBLICATIONS

European Search Report for Application No. 16200900.5-1762/3159577, dated Apr. 12, 2017. 7 pages.
(Continued)

*Primary Examiner* — William C Joyce
(74) *Attorney, Agent, or Firm* — Cantor Colburn LLP

(57) ABSTRACT

An actuator for driving a rotatable component includes a first, rotating member comprising a screw and a second member comprising a nut threaded to said screw, wherein rotation of said first member causes axial movement of said first or second member. The component also includes a third member coupled to the second member, wherein axial movement of said first or second member causes axial movement of said third member and a fourth, rotating member coupled to said third member and connectable to said component. The system also includes a bearing system located between said third member and said fourth member, said bearing system configured to cause said fourth member to rotate upon said axial movement of said third member so as to drive said component.

13 Claims, 2 Drawing Sheets

(51) Int. Cl.
*F16H 25/18* (2006.01)
*F16C 29/06* (2006.01)
*B64C 13/32* (2006.01)

(52) U.S. Cl.
CPC ....... *F16C 29/0692* (2013.01); *F16H 25/186* (2013.01); *F16H 25/20* (2013.01); *F16C 2326/43* (2013.01); *F16H 25/2247* (2013.01); *F16H 2025/2028* (2013.01); *F16H 2025/2075* (2013.01)

(58) Field of Classification Search
USPC .... 74/56, 57, 89.23, 424.88, 424.91, 424.93
See application file for complete search history.

(56) References Cited

U.S. PATENT DOCUMENTS

| | | | |
|---|---|---|---|
| 3,298,659 A | | 1/1967 | Cupedo |
| 3,329,036 A | * | 7/1967 | Whittaker ........... F16H 25/2247 74/424.91 |
| 3,374,685 A | * | 3/1968 | Eheim ................... F16H 25/125 74/56 |
| 3,731,546 A | | 5/1973 | MacDonald |
| 4,019,616 A | * | 4/1977 | Thorne ................... B41J 19/20 400/320 |
| 4,031,765 A | * | 6/1977 | Metz ..................... F16H 25/122 74/57 |
| 4,235,258 A | | 11/1980 | Uno et al. |
| 4,723,453 A | | 2/1988 | Kannapan et al. |
| 6,169,845 B1 | * | 1/2001 | Yamamoto ........... G11B 7/0037 360/13 |
| 7,654,164 B2 | | 2/2010 | Biester |
| 7,845,251 B2 | * | 12/2010 | Wu ..................... F16H 25/2219 74/424.86 |
| 8,375,813 B2 | | 2/2013 | Baumeister |
| 9,151,370 B2 | | 10/2015 | Li et al. |
| 9,216,815 B2 | | 12/2015 | Rodrigues |
| 2016/0146318 A1 | | 5/2016 | Trybula |

FOREIGN PATENT DOCUMENTS

| | | |
|---|---|---|
| EP | 0893624 A1 | 1/1999 |
| FR | 2992497 A1 | 12/2013 |
| JP | S5210250 A | 1/1977 |
| NL | 1036099 C | 4/2010 |

OTHER PUBLICATIONS

European Search Report for application No. EP14461591.1; dated May 21, 2015, 8 pages.

* cited by examiner

ACTUATOR

CROSS-REFERENCE TO RELATED APPLICATIONS

This application is a divisional of U.S. patent application Ser. No. 14/946,161, filed Nov. 19, 2015, which claims priority to European Patent Application No. 14461591.1, filed Nov. 21, 2014, the entire contents of both which are incorporated herein by reference.

TECHNICAL FIELD

The present disclosure generally relates to an actuator for driving a rotatable component, and a bearing system for use in an actuator.

BACKGROUND

Actuators may be used in, for example, aerospace applications, to drive primary control systems such as ailerons, elevators or rudders. Conventionally such actuators are hydraulic, and use fluid transfer between two or more reservoirs of hydraulic fluid as a means for controlling the position of the control systems.

SUMMARY

In accordance with an aspect of the present disclosure, there is provided an actuator for driving a rotatable component, comprising: a first, rotating member comprising a screw; a second member comprising a nut threaded to the screw, wherein rotation of the first member causes axial movement of the first or second member; a third member coupled to the first or second member, wherein axial movement of the first or second member causes axial movement of the third member, a fourth, rotating member coupled to the third member and connectable to the component; and a bearing system located between the third member and the fourth member, the bearing system configured to cause the fourth member to rotate upon the axial movement of third member so as to drive the component.

The disclosure involves converting rotational movement of the first member, for example a ball screw, to axial reciprocating movement of the third member and first or second member, preferably via the nut, and then a further conversion of this reciprocating movement to rotational movement of the component, for example arms of the actuator. This is an improvement over conventional methods of driving a rotatable component that use hydraulics, for example.

The first member and/or second member and/or third member and/or fourth member may be substantially tubular or cylindrical. The first and fourth member may be restricted against axial movement and second and third member may be restricted against rotational movement.

The actuator may be for use in an aircraft or other aerospace applications, for example for driving flight control system components such as ailerons and/or elevators and/or rudders. The actuator may be for driving the rotatable component between stowed and deployed positions and/or between unextended and extended positions.

The bearing system may comprise one or a plurality of roller bearings moveable along a helical track located on said third or fourth member, wherein optionally, upon the axial movement of said first and third member, said roller bearings apply a force to said track, or said track applies a force to said roller bearings, so as to cause rotation of said fourth member to drive said component.

The first member may be fixed in an axial or longitudinal direction, and rotation of the first member may cause axial movement of the second and third member. Alternatively, the second member may be fixed in an axial or longitudinal direction and rotation of the first member may cause axial movement of the first and third member. Roller bearings may be interposed between the third and fourth member, wherein the roller bearings optionally apply a rotational force to the fourth member upon axial movement of the third member.

The fourth member may comprise the helical track, which helical track may comprise two opposing rails, and the one or a plurality of roller bearings may be axially moveable with the third member and may contact both of the rails. Upon axial movement of the third member, the roller bearings may apply a force to the helical track, for example at least one of the rails, so as to cause rotation of the fourth member to drive the component.

The third member may comprise the helical track, which helical track may comprise two opposing rails, and the one or a plurality of roller bearings may be rotatably moveable with the fourth member and may contact both of the rails. Upon axial movement of the third member, the helical track, for example the opposing rails, may apply a force to the roller bearings so as to cause rotation of the fourth member to drive the component.

The opposing rails may be parallel.

It will be appreciated that the rotational movement of the fourth member is due to the helical nature of the helical track, and may be further assisted by restricting the axial movement of the fourth member and/or the rotational movement of the third member. The third member may comprise a slider, or sliding portion, that is restricted against rotational movement, and the slider, or sliding portion, may comprise the bearing system as described herein.

The bearing system may comprise roller bearings, or the roller bearings may be, axially moveable with the third member, or rotatable with said fourth member.

The fourth member may comprise a first helical rail configured to contact the roller bearings, and the third member may comprise a second helical rail configured to contact the roller bearings.

Upon the axial movement the first helical rail and the second helical rail may be brought into engagement with the roller bearings so as to cause rotation of the fourth member to drive the component.

The first and second helical rails may be parallel with one another.

The screw pitch of the first member may be smaller than the pitch of the helical track, first helical rail and/or second helical rail. For example, a pitch of the screw of the first member may be at least 5, 10, 20, 50, 100 or 200 times less than a pitch of said helical track, first helical rail and/or second helical rail. The ratio between the pitch of the screw of the first member and the pitch of the helical track, first helical rail and/or second helical rail may be less than 1:5, 1:10, 1:20, 1:50, 1:100 or 1:200.

The first member may be fixed in an axial direction, and rotation of the first member may cause axial movement of the nut; or the nut may be fixed in an axial direction, and rotation of the first member may cause axial movement of the first member.

The axes of rotation of the first member and fourth member may be coincident or coaxial.

The axial movement of the first and/or second and/or third member may be along an axis that is coincident or coaxial with the axes of rotation of the first member and the fourth member.

The rotational range of motion of the third or fourth member may be less than 360 degrees, or less than 270, 180, 90, 60 or 30 degrees. The rotational range of motion may be defined by the helical track, first helical rail and/or second helical rail.

Rotation of the first member may be driven by an electric motor. The actuator may be driven by an electric motor. The actuator may comprise no hydraulic components.

The first member may comprise a ball screw, lead screw or roller screw.

In accordance with an aspect of the present disclosure, there is provided a method of driving a rotatable component, comprising: providing an actuator as described above.

The method may further comprise rotating the first member so as to cause axial movement of the first or second and third member, and thereby rotation of the fourth member to drive the component.

The bearing system described herein is advantagous in its own right. Therefore an aspect of the present disclosure provides a bearing system comprising: a first component axially moveable along a first axis; a second component rotatable about a second axis, wherein the first component is restricted against rotational movement and the second component is restricted against axial movement. In this aspect the first component comprises a first helical track, and the second component comprises a second helical track that opposes the first helical track. This aspect also includes one or more roller bearings located between the first helical track and the second helical track, wherein upon axial movement of the first component, the first helical track is urged towards the second helical track such that a force is applied through the roller bearings to the second component so as to rotate the second component about the second axis.

Force may be transferred from the first component to said second component via the roller bearings. The helical nature of the first and second helical tracks, in conjunction with the restricted movements of the first and second components in rotational and axial directions respectively, means that an axial force in said first component is transferred to a rotational force in said second component.

The bearing system may be for use in an actuator, for example an actuator for driving a rotatable component, and/or an actuator for use in an aircraft or other aerospace applications, for example for driving flight control system elements such as ailerons and/or elevators and/or rudders, or for driving a rotatable component between stowed and deployed positions and/or between unextended and extended positions.

The first component and second component may be substantially cylindrical and/or comprise cylindrical tubes. For example, the first component and the second component may comprise concentric cylindrical tubes. The first component may be slidably received within the second component.

The first helical track may comprise a first helical rail, and the second helical track may comprise a second helical rail, such that upon axial movement of the first component, the first helical rail is urged towards the second helical rail.

The first helical track and/or second helical track may comprise opposing rails. The first helical rail and/or second helical rail and/or opposing rails may comprise grooves or protrusions on the first and/or second components respectively.

The first helical track may comprise two helical grooves. The second helical track may comprise two helical rails that cooperate with the helical grooves, such that the two helical rails may be slidably received within the helical grooves. The roller bearings may be located within the helical grooves, wherein axial contact between the helical grooves and helical rails may be prevented by the roller bearings.

The first component may comprise two axially separated transverse grooves connecting the helical grooves. A central protrusion may be located on the first component between the helical grooves and the transverse grooves. The two helical grooves, two transverse grooves, and central protrusion may form a track for the roller bearings, for example an O-shaped track.

The roller bearings may be positioned within the track in a manner that allows free movement of the roller bearings around the track. In use, the roller bearings may travel around the track upon axial movement of the first component, while transferring force from the first component to the second component. One or more further protrusions may be provided on the first component to enclose the track. The grooves and protrusions may be provided on an inner or outer surface of the first component, and the rails may be provided on an outer or inner surface of the second component, respectively.

Any of the embodiments of the bearing system described above may be used as the bearing system in the actuator described above. In this case, the first component may be the third member, slider or sliding portion, and the second component may be the fourth member.

In accordance with an aspect of this disclosure, there is provided a method of operating the bearing system described above, comprising: moving the first component in an axial direction, so as to cause rotation of the second component.

BRIEF DESCRIPTION OF THE DRAWINGS

Various embodiments will now be described, by way of example only, and with reference to the accompanying drawings in which.

DETAILED DESCRIPTION

Figure 1:
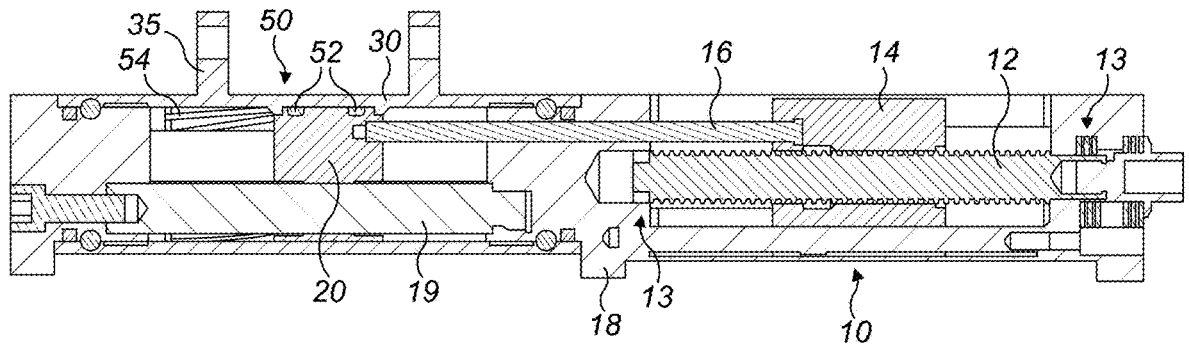
FIG. 1 shows a cross-section of an actuator in accordance with this disclosure.
Figure 2:
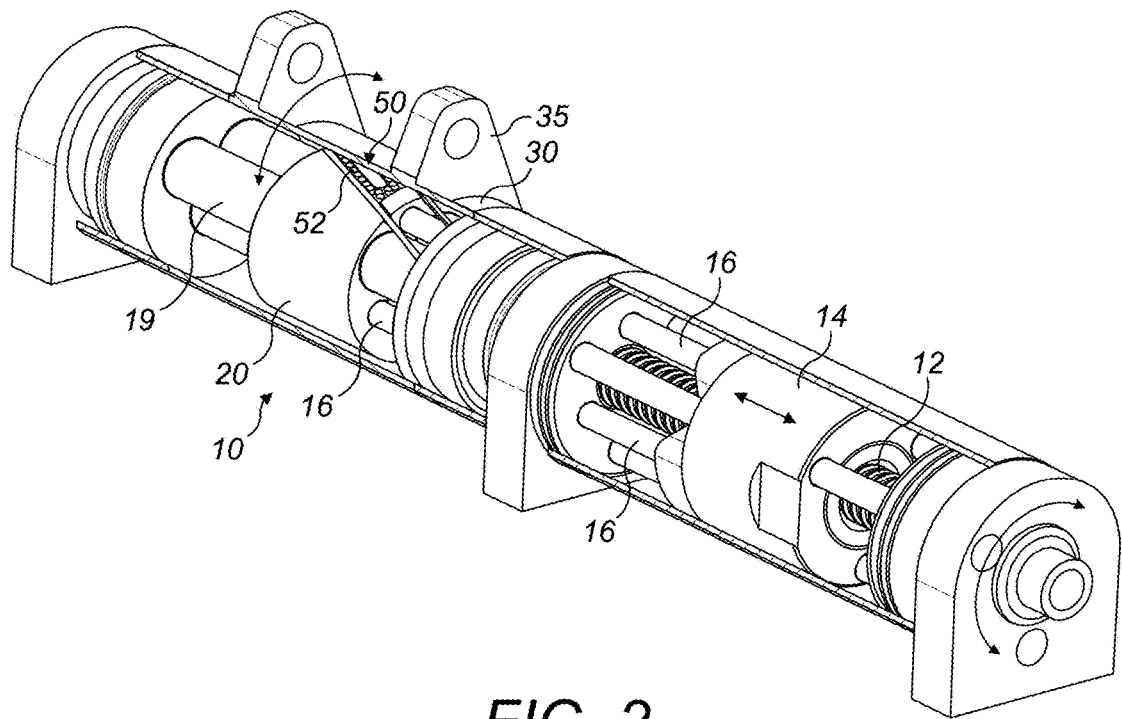
FIG. 2 shows a perspective view of the actuator of FIG. 1.

FIGS. 1 and 2 show an actuator 10 in accordance with the present disclosure.

The actuator 10 may comprise an electric motor (not shown) that is configured to rotate a first member, in the form of ball screw 12. The ball screw 12 may be fixed against movement in an axial or longitudinal direction by bearings 13. A second member, comprising nut 14 is threaded to said ball screw and is moveable in the longitudinal direction. Thus, rotation of the screw 12 causes nut 14 to move longitudinally along the length of the screw 12.

The second member may comprise one or more moveable rods 16 fixed to the nut 14 that extend in a longitudinal direction, through an intermediate housing 18 of the actuator 10. The one or more rods 16 may be coupled with a third member in the form of a slider 20 that forms part of the second member as well. The slider 20 moves in the axial or longitudinal direction along one or more fixed rods 19. The one or more fixed rods 19 restrict or prevent rotational movement of the slider. The slider 20 is of tubular form (see FIG. 4B).

Thus, upon rotation of the screw 12 the nut 14 moves in the axial or longitudinal direction. This causes moveable rods 16 and slider 20 to also move in the axial or longitudinal direction.

A fourth, rotating member, in the form of a sleeve 30 may be coupled to the slider 20 via a bearing system 50. The bearing system 50 comprises one or more low friction roller bearings 52 that move with the slider 20. As the slider 20 is restricted against rotational movement, the roller bearings 52 are also restricted against rotational movement. Therefore, the roller bearings 52 move as a unit in the axial or longitudinal direction with the slider 20. The sleeve 30 is of tubular form (see FIG. 4A) and encloses the slider 20. In other words the slider 20 may be slidably received within the sleeve 30.

One or more helical tracks 54 are provided on the sleeve 30. The helical track 54 has a longitudinal axis that is offset from the longitudinal axis of the sleeve 30. The helical track 54 may comprise two helical rails. The roller bearings 52 are configured to contact the helical track 54, and may sit within the two helical rails as shown in FIG. 2. It will be appreciated that the roller bearings 52 move only in the axial or longitudinal direction, as they are restricted from rotational movement. Therefore, upon axial movement of the slider 20, the roller bearings 52 move along the helical track. Due to the helical nature of the track, this causes the roller bearings 52 to push against the track and rotate the sleeve 30.

The helical track 54 may have a high pitch, such that the roller bearings 52 easily move along the helical track 54 upon axial movement of the slider 20. The high pitch also means that the axial force from the roller bearings 52 is easily transferred to a rotational force of the sleeve 30, and the actuator has a high torque.

For example, the helical track 54 may extend around less than 360 degrees, 270 degrees, 180 degrees, 90 degrees, 60 degrees or 30 degrees of the circumference of the sleeve 30. In other words, the rotational range of motion of the sleeve may be less than 360 degrees, 270 degrees, 180 degrees, 90 degrees, 60 degrees or 30 degrees respectively. In the illustrated example, the rotational range of motion is 60 degrees.

The pitch of the ball screw 12 is much lower than that of the helical track 54, and optionally at least 50 times lower, for example 130 times lower. The pitch of the ball screw may be less than 25, 10, 5 or 2 mm, and the pitch of the helical track may be greater than 100, 250, 500 or 1000 mm.

The sleeve 30 may have actuator arms 35 connected to it, and rotation of the sleeve 30 causes actuator arms 35 to rotate as well. The actuator arms 35 may comprise part of, or be coupled to, a rotatable component, for example an aircraft flight control system element such as one or more ailerons and/or elevators and/or rudders. In this manner, the actuator drives the rotatable component.

In other arrangements, the second member, comprising nut 14 could be fixed in the axial or longitudinal direction, and the first member or ball screw 12 could move in the axial or longitudinal direction to cause moveable rods 16 and slider 20 to also move in the axial or longitudinal direction. In these embodiments, the first member or ball screw 12 may be connected or coupled to the moveable rods 16 and slider 20 and/or the fourth member.

Figure 3:
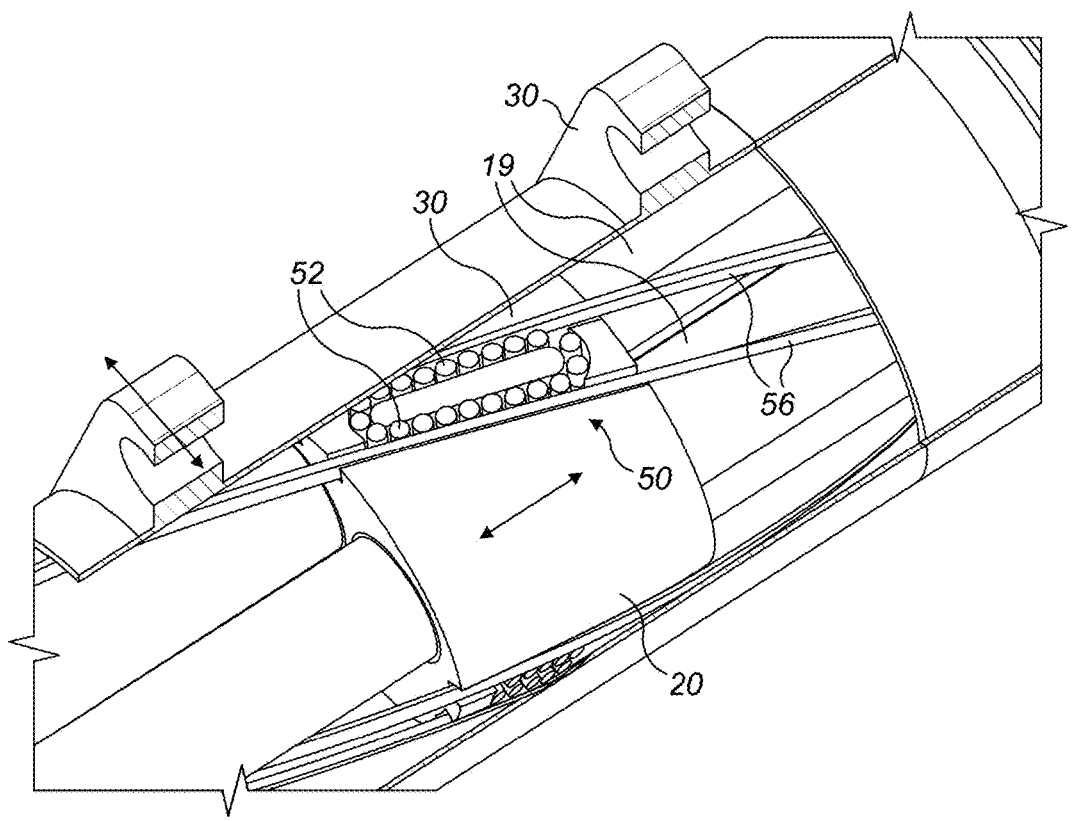
FIG. 3 shows a bearing system in accordance with this disclosure.
Figure 4A:
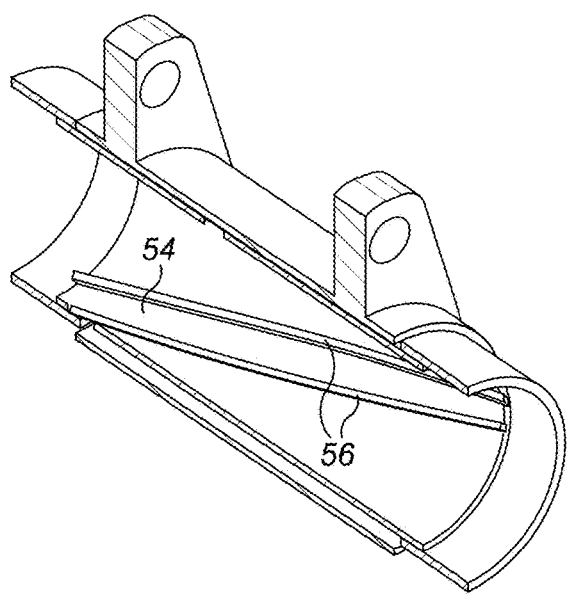
FIGS. 4A and 4B show components of the bearing system of FIG. 3.
Figure 4B:
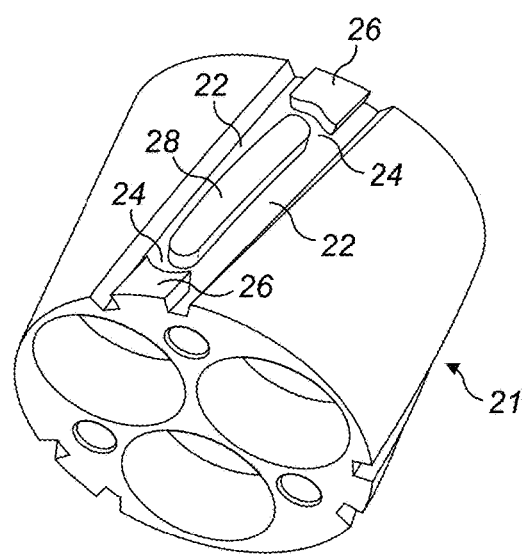

FIGS. 3, 4A and 4B show the bearing system 50 in detail.

The sleeve 30 comprises one or more helical tracks 54, which as described above may comprise two helical rails 56, each having a longitudinal axis that is offset from the longitudinal axis of the sleeve 30.

The slider 20 comprises a groove arrangement 21 comprising two helical grooves 22, each having a longitudinal axis that is offset from the longitudinal axis of the slider 20. The groove arrangement 21 may further comprise two end protrusions 26 and a central protrusion 28 between the grooves 22, as well as two lateral grooves 24 that interconnect the pair of helical grooves 22.

The protrusions 26, 28 are sized such that the helical rails 56 are slidably received within the helical grooves 22 and end protrusions 26. The central protrusion 28 is sized such that the roller bearings 52 fit circumferentially between the helical rails 56 and the central protrusion 28. The end protrusions 26 are sized such that the roller bearings 52 do not fit circumferentially between the helical rails 56 and the end protrusions 26. The lateral grooves 24 are sized such that the roller bearings 52 can travel between the helical grooves 22 via the lateral grooves 24.

Generally, therefore, a groove arrangement 21, for example as described above, may be provided on the first or second member and may form a closed pathway for the roller bearings 52, or rollers, to move around upon axial movement of the first or second member, for example the slider 20, whilst still pushing against the helical track 54 so as to transfer the axial force of the first or second member to the helical track 54, in turn causing rotational movement of the third member.

A groove arrangement 21 as described above may alternatively be provided on the fourth member, and the groove arrangement 21, as well as roller bearings 52, may be rotationally moveable with the fourth member and may form a closed pathway for the roller bearings, or rollers, to move around upon axial movement of the third member. In these arrangements, a helical track 54, for example as described above, may be provided on the axially moveable third member, and the helical track 54 would push against the roller bearings 52 so as to transfer the axial force of the third member to the roller bearings 52, in turn causing rotational movement of the fourth member.

The invention claimed is:

1. A bearing system comprising:
   a first component axially moveable along a first axis;
   a second component rotatable about a second axis, wherein said first component is restricted against rotational movement and said second component is restricted against axial movement;
   wherein said first component comprises a first double helical track comprising two helical grooves, and said second component comprises a second double helical track comprising two helical rails that oppose said first double helical track, said two helical rails cooperating with said two helical grooves; and
   one or more roller bearings located between said first double helical track and said second double helical track, wherein upon axial movement of said first component, said first double helical track is urged towards said second double helical track such that a force is applied through said roller bearings to said second component so as to rotate said second component about said second axis;
   wherein said two helical grooves of said first component houses said one or more roller bearings, the two helical grooves forming a closed pathway for the one or more roller bearings on said first component.

2. A bearing system as claimed in claim 1, wherein said first and second double helical tracks are parallel with one another.

3. A bearing system as claimed in claim 1, further comprising two lateral grooves in the first component that interconnect the two helical grooves of the first component.

4. A bearing system as claimed in claim 1, wherein said first and second double helical tracks are parallel with one another, and further comprising two lateral grooves in the first component that interconnect the two helical grooves of the first component.

5. A bearing system as claimed in claim 1, wherein the second component circumscribes the first component.

6. A bearing system as claimed in claim 1, wherein the first double helical track has a pitch such that said first double helical track extends around less than 360 degrees of the circumference of the first component.

7. A bearing system as claimed in claim 1, wherein a rotational range of motion of the second component is less than 360 degrees.

8. A bearing system comprising:
   a first component axially moveable along a first axis;
   a second component rotatable about a second axis, wherein said first component is restricted against rotational movement and said second component is restricted against axial movement;
   wherein said first component comprises a first double helical track comprising two helical grooves, and said second component comprises a second double helical track comprising two helical rails that oppose said first double helical track, said two helical rails cooperating with said two helical grooves; and
   one or more roller bearings located between said first double helical track and said second double helical track, wherein upon axial movement of said first component, said first double helical track is urged towards said second double helical track such that a force is applied through said roller bearings to said second component so as to rotate said second component about said second axis;
   wherein said two helical grooves of said first component houses said one or more roller bearings;
   wherein the two helical grooves in the first component are interconnected by two lateral grooves in the first component.

9. A bearing system as claimed in claim 8, wherein said first and second double helical tracks are parallel with one another.

10. A bearing system as claimed in claim 8, wherein said two helical grooves of the first component forms a closed pathway for the one or more roller bearings.

11. A bearing system as claimed in claim 8, wherein the second component circumscribes the first component.

12. A bearing system as claimed in claim 8, wherein the first double helical track has a pitch such that said first double helical track extends around less than 360 degrees of the circumference of the first component.

13. A bearing system as claimed in claim 1, wherein a rotational range of motion of the second component is less than 360 degrees.

* * * * *